United States Patent
Achari et al.

[11] Patent Number: 5,863,493
[45] Date of Patent: Jan. 26, 1999

[54] LEAD-FREE SOLDER COMPOSITIONS

[75] Inventors: Achyuta Achari; Mohan R. Paruchuri, both of Canton; Dongkai Shangguan, Novi, all of Mich.

[73] Assignee: Ford Motor Company, Dearborn, Mich.

[21] Appl. No.: 771,351

[22] Filed: Dec. 16, 1996

[51] Int. Cl.⁶ .................................................. C22C 13/00
[52] U.S. Cl. .......................... 420/557; 420/560; 420/561; 420/562; 148/400
[58] Field of Search ..................... 420/557, 560, 420/561, 562; 148/400

[56] References Cited

U.S. PATENT DOCUMENTS

| | | | |
|---|---|---|---|
| 1,565,115 | 12/1925 | Speed et al. | 420/562 |
| 3,157,473 | 11/1964 | Reginald | 428/621 |
| 3,503,721 | 3/1970 | Lupfes | 420/560 |
| 3,607,253 | 9/1971 | Cain | 420/577 |
| 4,011,056 | 3/1977 | Steine et al. | 428/673 |
| 4,214,903 | 7/1980 | Murabayashi et al. | 420/562 |
| 4,643,875 | 2/1987 | Mizuhara | 420/502 |
| 4,758,407 | 7/1988 | Ballentine et al. | 428/633 |
| 4,797,328 | 1/1989 | Boehm et al. | 428/626 |
| 4,806,309 | 2/1989 | Tulman | 420/557 |
| 5,328,660 | 7/1994 | Gonya et al. | 420/562 |
| 5,344,607 | 9/1994 | Gonya et al. | 420/562 |
| 5,429,689 | 7/1995 | Shangguan et al. | 148/400 |
| 5,455,004 | 10/1995 | Slattey et al. | 420/562 |

FOREIGN PATENT DOCUMENTS

| | | |
|---|---|---|
| 3830694 A1 | 3/1990 | Germany . |
| 08001373 | 1/1996 | Japan . |

*Primary Examiner*—Sikyin Ip
*Attorney, Agent, or Firm*—Damian Porcari

[57] ABSTRACT

Electrical solder compositions (by weight percent) having between 91.5–96.5% Sn; 2–5% Ag; 0.1–3% Ni; and 0–2.9% Cu; and having a melting temperature 220° C. or less. The solder compositions have microstructure with uniformly dispersed fine grains of Sn—Ni, Sn—Cu and Sn—Cu—Ni intermetallic phases that provide resistance to grain growth during thermal cycling.

8 Claims, No Drawings

LEAD-FREE SOLDER COMPOSITIONS

BACKGROUND OF THE INVENTION

Technical Field

The present invention relates to an electrical solder composition comprising tin (Sn), silver (Ag) and nickel (Ni), and optionally copper (Cu). More specifically, the present invention relates to an electrical solder composition having between 91.5–96.5% Sn; 2–5% Ag; 0.1–3% Ni and 0–2.9% Cu; and having a melting temperature 220° C. or less. All percentages are by weight.

DESCRIPTION OF THE RELATED ART

It is known to manufacture electrical solders without the presence of lead. Lead has been found to be a toxic material whose handling and disposal increases manufacturing costs and complexity. A number of electrical solders have been proposed that do not include lead. These solders generally contain tin (Sn), indium (In), bismuth (Bi), silver (Ag) and a variety of other materials. A summary of these lead free solders is outlined in Table 1.

TABLE 1

(Prior Art)

| No. | U.S. Pat. No. | Sn [Wt %] | In [Wt %] | Bi [Wt %] | Ag [Wt %] | Other [Wt %] | Melting [°C.] |
|---|---|---|---|---|---|---|---|
| 1 | 4,806,309 | 90–95 | — | 1–4.5 | 0.1–0.5 | 3–5 Sb | 218–235 |
| 2 | 1,565,115 | 87–92 | — | — | 8–13 | 3 Au, Pd | 283–330 |
| 3 | 4,797,328 | 86–99 | 0–10 | — | 0–13 | 1–10 Ti, Zr | 700–950 |
| 4 | 3,607,253 | 89.3–96.0 | — | 1–5 | 3–3.8 | 0.7–1.3 Cd 0.2–0.5 Sb | 210 |
| 5 | 3,157,473 | (1) — | 100 | — | — | — | 157 |
|   |   | (2) — | 97 | — | 3 | — | 144 |
|   |   | (3) 49.1 | 50.9 | — | — | — | 120 |
| 6 | 3,503,721 | 90–98 | — | — | 2–10 | — | 220 |
| 7 | 5,455,004 | 82–90 | 3.5–6 | 1–5 | — | 4.5–6 Zn | 190 |
| 8 | 5,429,689 | 80.0 | 5–14.5 | 4.5–14.5 | 0.5 | — | 175–220 |
| 9 | 5,344,607 | 70–90 | 8–20 | 2–10 | — | — | 153–199 |
| 10 | 5,328,660 | 78.4 | 9.8 | 9.8 | 2 | — |   |
| 11 | 4,214,903 | 22–35 | 2–12 | 53–76 |   |   |   |
| 12 | 4,011,056 | 0.5–3.5 |   |   | 35–48 | 25–35 Zn, 0.01–0.4 Si, 0–1 Ni, 0–1 Pd, 0–0.5 P |   |
| 13 | 4758407 | 92.5–96.9 |   |   |   | 3–5 Cu, 0.1–2 Ni, 0–5 Ag |   |

U.S. Pat. No. 4,758,407, teaches a plumbing solder composition of 92.5–96.9% Sn, 3–5% Cu, 0.1–2% Ni and 0–5% Ag. It is described as having a wide melting range for joining copper tubes and brass pipe and fittings. This solder composition was found to be especially suited for plumbing applications having "tight loose fitting solder joints which are exposed to potable water." Plumbing solders such as those disclosed in 4,758,407, are formulated to have a wide melting range to easily flow between the fittings. They generally melt at much higher temperatures than electrical solders because the underlying base materials (metal plumbing fixtures) can easily withstand these higher melting temperatures. Electrical solders, on the other hand, should generally have a narrow melting range and lower melting temperatures to protect the substrates and electrical components. Additionally, as will be more fully described below, concentrations above 3% Ni and Cu will reduce the benefits of eutectic microstructures and reduce the strength of the solder after thermal cycling.

U.S. Patent No. 4,011,056, teaches a solder or brazing composition of 35–48% Ag, 25–35% Zn, 3–5% Cu, 0.5–3.5% Sn, 0.01–0.4% Si, 0–1% Ni, 0–1% Pd and 0–0.5% P. The high content Ag makes this composition impractical for high volume electrical solder usage. Additionally, the high percentage of Zn in this solder causes corrosion problems. Because of the high melting temperatures, these solder compositions can not be used for electronic applications.

U.S. Pat. No. 3,607,253, teaches a solder composition that contains cadmium (Cd) which like lead, is also toxic. It is both difficult to work and handle and also produces a hazardous waste.

U.S. Pat. Nos. 4,806,309, 1,565,115, provide solder compositions with relatively high melting temperatures and wide melting range. Also, the solder composition in U.S. Patent 1,565,115, is expensive because it contains Au and Pd.

U.S. Pat. Nos. 4,797,328, 3,157,473, 5,455,004, 5,429,689, 5,344,607, 5,328,660, and 4,214,903, all include high quantities of indium. Indium is very expensive and a limited mineral reserve. Solders having large quantities of indium are generally impractical for high volume production usage as anticipated by the present invention.

SUMMARY OF THE INVENTION

Currently, the vast majority of electronics manufacturing activities use eutectic tin-lead (63% Sn— 37% Pb) solder, the melting temperature of which is 183° C. It is useful to identify a solder that is lead-free and therefore less toxic to users and the environment.

Of the common lead-free alternatives, eutectic 96.5% Sn— 3.5% Ag solders (included in U.S. Pat. No. 3,503,721) are preferred because they provide good ductility and resistance to fatigue and creep (due to expansion and contraction from temperature changes). Sn—Ag eutectic solders initially perform well, but generally experience grain growth when subjected to thermal cycling. The grain growth (coarsening) decreases creep and fatigue resistance. Small additions of Ni and optionally Cu to the alloy increase both properties and demonstrate narrow melting temperature range. It is especially well suited for automotive electronics applications because of its ability to withstand long term thermal cycling.

The present invention is related to an electrical solder composition having between 91.5–96.5% Sn; 2–5% Ag; 0.1–3% Ni; and 0–2.9% Cu and having a melting temperature of 220° C. or less. All percentages are by weight. The solder compositions have uniformly dispersed fine grains of Sn—Ni intermetallics that are very resistant to coarsening due to thermal cycling. Solder compositions having Cu also include fine grains of Sn—Cu and Sn—Ni—Cu intermetallic phases.

It is also a desired feature of the present invention to provide a solder exhibiting favorable thermal and electrical conductivity and satisfactory mechanical properties. Another object of the invention is to provide a lead-free solder composition that is affordable and in a reasonable supply for large volume production use. These and other advantages, features and objects of the present invention will become more apparent to those of ordinary skill in the art upon reference to the following description.

DETAILED DESCRIPTION OF THE PREFERRED EMBODIMENTS

The present invention is directed to a lead free solder that provides good fatigue and creep resistance. It is especially directed to providing a durable and damage resistant electrical interconnect for electronic components exposed to wide temperature variations as is commonly found in automotive applications. A common automotive test for measuring the durability of a solder is to expose the interconnect to a large temperature variation, typically from −40° to 125° C. In this accelerated test, temperature variation is repeated more than one thousand times. Each cycle from hot to cold causes the substrate, electronic component, metal leads and the solder to expand and contract (often widely different coefficients of thermal expansion).

The repeated cycle of hot and cold causes fatigue in the solder interconnect and weakens the attachment. If the weakening is extensive, the interconnect fails by solder cracking and the component becomes inoperable. While not wishing to be bound by the following theory, it is believed that the thermal cycling causes the microstructure of the solder to coarsen. The coarser grain structure leads to reduced fatigue strength and makes the solder more susceptible for crack formation and propagation under thermomechanical loading. The inclusion of small quantities of Ni and Cu in the Sn—Ag alloy creates intermetallic Sn—Ni, Sn—Cu, and Sn—Cu—Ni phases. These additional phases with finer grain structure tend to resist grain coarsening.

The solder compositions that were found to include the preferred properties over standard 96.5 tin—3.5% silver solder include: 91.5–96.5% tin (Sn), 2–5% silver (Ag) 0.1–3% nickel (Ni) and 0–2.9% copper (Cu). All percentages are by weight.

Fabrication of sample compositions

Solder samples were fabricated using well-established methods. High purity metals were used as starting materials. These included 99.99+% Sn shots, 99.99+% Ni, Cu and Ag wire bits. These ingredients were mixed in pre-determined proportions. Alumina crucibles were used. The ingredients were melted in a tube furnace, under a flowing $N_2$ atmosphere to prevent oxidation. The alloy was kept in a molten state for up to 20 minutes and stirred for homogenization. Furnace temperature was measured with thermocouples and recorded with a chart recorder.

The following samples were made by mixing respective starting metals in the proportions shown below.

Chemical Compositions

TABLE 2

Solder Alloys (weight percentages)

| Alloy Sample No. | Sn | Ag | Ni | Cu | Micro Hardness (KHN) | Melting Temp (°C.) |
|---|---|---|---|---|---|---|
| 1 (PRIOR ART) | 96.5 | 3.5 | — | — | 16.6 | 221 |
| 2 | 96.5 | 3.0 | 0.5 | — | 15.4 | 220 |
| 3 | 96.5 | 2.5 | 1.0 | — | 16.4 | 220 |
| 4 | 96.5 | 2.5 | 0.5 | 0.5 | 16.1 | 220 |
| 5 | 96.0 | 2.0 | 1.0 | 1.0 | 15.6 | 217 |
| 6 | 95.0 | 3.0 | 1.0 | 1.0 | 14.9 | 217 |
| 7 | 94.0 | 2.0 | 2.0 | 2.0 | 14.5 | 216 |

Samples were taken from each alloy ingot and submitted for chemical analysis. Results indicate that the final alloy composition is close to the starting composition.

A metallurgical examination using metallotraphy and electron microscopy was performed on each sample. The prior art alloy No. 1 exhibited a binary eutectic composition having a melting point of 221° C. The alloy exhibits a eutectic microstructure consisting of the Sn-phase and the Sn—Ag intermetallic phase. These two phases become coarser when the solder is subjected to thermal cycling. Thermal cycling is a process of aging the soldered component between temperature extremes (typically −40° to 125° C.). The coarser grains of these two phases make the solder less resistant to crack formation and propagation in the interconnect.

Alloys 2 and 3 include 0.5% and 1% Ni, respectively. The small amount of Ni reduces the melting temperature of the alloy because the additional element reduces the free energy of the resulting three-element alloy system. Alloys 2 and 3 consist of primarily Sn-rich phase and dispersed Sn—Ag and Sn—Ni intermetallics. The Sn forms intermetallics with Ag and Ni. The uniformly dispersed fine, needle-like grains of Sn—Ni intermetallic phase appear as long grains.

Alloys 4–7 include between 0.5 and 2.0 % Cu. The addition of Cu causes the formation of dispersed platelet-like grains of Sn—Cu—Ni and Sn—Cu intermetallic phases. The larger amounts of Ni and Cu in the Sn—Ag eutectic progressively increases the grain size of these intermetallics in the alloy.

Inclusion of small amounts of Ni and Cu are helpful for enhancing fatigue/creep resistance via grain growth control. It is thought that the intermetallic particles impede grain growth and retard grain coarsening. Thus, another feature of the present solders is their stability after thermal aging. This long term thermal stability is essential for solder interconnects used in automotive applications.

Differential Scanning Calorimetric (DSC) Analysis

Samples were taken for each alloy ingot for DSC analysis. The melting temperatures of the alloys in Table 2 were determined by differential scanning calorimetric (DSC) analysis. The analysis was performed using a DuPont DSC 2910 system under a flowing $N_2$ atmosphere at a given heating/cooling rate (5° C./minute) The characteristic temperatures from the DSC curves were analyzed to determine the melting temperatures of the alloys, which are summarized in Table 2 above.

Microstructural Analysis

Microstructural analysis was performed using chemical etching, optical microscopy, scanning electron microscope (SEM) microprobe, and x-ray diffraction (XRD). Suitable etchants for the disclosed alloys include a solution of diluted hydrochloric acid.

The microhardness of these alloys have been measured on a microhardness tester. Thirty measurements were taken for each sample using a 25 g load for 0.5 seconds and the average was taken for each sample. The results of the hardness (expressed as a Knoop hardness number or KHN) are summarized in Table 2 above.

The microstructures of the alloys were examined with a scanning electron microscope and results are summarized in the table below.

TABLE 3

| Alloy No. | Microstructure |
|---|---|
| 1 (PRIOR ART) | Eutectic microstructure consisting of Sn-phase and Sn—Ag intermetallic phase |
| 2 | Dispersed small needle-like grains of Sn—Ni intermetallic phase in Sn—Ag eutectic |
| 3 | Dispersed long needle-like grains of Sn—Ni intermetallic phase in Sn—Ag eutectic |
| 4 | Dispersed small grains of Sn—Cu intermetallic phase and small grains of Sn—Ni—Cu intermetallic phase in Sn—Ag eutectic |
| 5 | Dispersed small grains of Sn—Cu intermetallic phase and larger grains of Sn—Ni—Cu intermetallic phase in Sn—Ag eutectic |
| 6 | Dispersed small grains of Sn—Cu intermetallic phase and platelets of Sn—Ni—Cu intermetallic phase in Sn—Ag eutectic |
| 7 | Dispersed small grains of Sn—Cu intermetallic phase and larger platelets of Sn—Ni—Cu intermetallic phase in Sn—Ag eutectic |

The formation of Sn—Ni, Sn—Cu and Sn—Ni—Cu intermetallic phases inhibits grain growth. This long term fine-grain microstructure is believed to be key to durability by increasing the creep resistance and the fatigue strength because the fine grain structure resists crack propagation and reduces the likelyhood of fracture. Concentrations higher than 3% Ni or Cu will reduce the benefits of eutectic microstructures and will increase the melting temperature range.

Application

Alloys 2–7 were found to be non-toxic and readily manufacturable. They produced few toxic or hazardous waste materials and utilized existing commercial equipment for manufacturing and usage. Because of the relatively low silver content, the alloys were low cost and suitable for production in large commercial quantities.

The solders made from these compositions may be used in either a paste form (as in reflow soldering) or alternatively in bar solder form (as in wave soldering). Regular soldering processes (reflow, wave soldering and others) may be used with these solder compositions. In each case, the soldering peak temperature will generally be at least 10°–15° C. or preferably 15°–30° C. above the melting temperature of the solder alloy.

Different alloys may be adapted for further improvement of mechanical and physical properties by the inclusion of small quantities (less than 1% by weight) of other elements such as Bi, In, Sb, Ce and Zn. Addition of Bi or In will reduce the melting temperature of these solders. The addition of up to 2.5% Au improves ductility and strength of the alloy.

While the best mode for carrying out the present invention has been described in detail, those familiar with the art to which the invention relates will recognize various alternative designs and embodiments for practicing the invention as defined by the following claims.

What is claimed:

1. An electrical solder composition consisting essentially of:

between 91.5–96.5% Sn;

2–5% Ag;

0–2% Cu;

0.1–2% Ni and having a melting temperature 220° C. or less.

2. The electrical solder composition of claim 1, wherein said composition is about:

96.5% Sn;

3% Ag;

0.5% Ni and having a Sn—Ag eutectic microstructure and dispersed small needle-shaped grains of Sn—Ni intermetallic phase.

3. The electrical solder composition of claim 1, wherein said composition of claim 1, wherein said composition is about:

96.5% Sn;

2.5% Ag;

1.0% Ni and having a Sn—Ag eutectic microstructure and dispersed small needle-shaped grains of Sn—Ni intermetallic phase.

4. The electrical solder composition of claim 1, wherein said composition is about:

96.5% Sn;

2.5% Ag;

0.5% Cu;

0.5% Ni and having a Sn—Ag eutectic microstructure and dispersed small grains of Sn—Cu intermetallic phase and small grains of Sn—Ni—Cu intermetallic phase.

5. The electrical solder composition of claim 1, wherein said composition is about:

96.0% Sn;

2.0% Ag;

1.0% Cu;

1.0% Ni and having a Sn—Ag eutectic microstructure and dispersed small grains of Sn—Cu intermetallic phase and large grains of Sn—Ni—Cu intermetallic phase.

6. The electrical solder composition of claim 1, wherein said composition is about:

95.0% Sn;

3.0% Ag;

1.0% Cu;

1.0% Ni and having a Sn—Ag eutectic microstructure and dispersed small grains of Sn—Cu intermetallic phase and platelets of Sn—Ni—Cu intermetallic phase.

7. The electrical solder composition of claim 1, wherein said composition is about:

94.0% Sn;

2.0% Ag;

2.0% Cu;

2.0% Ni and having a Sn—Ag eutectic microstructure and dispersed small grains of Sn—Cu intermetallic phase and larger platelets of Sn—Ni—Cu intermetallic phase.

8. An electrical solder composition consisting essentially of about:

96.5% Sn;

2.5% Ag;

0.5% Ni;

0.5% Cu and having a melting temperature 220° C. or less.

* * * * *